(12) United States Patent
Terashima et al.

(10) Patent No.: US 8,081,919 B2
(45) Date of Patent: Dec. 20, 2011

(54) IMAGE PROCESSING APPARATUS (75) Inventors: Hideyuki Terashima, Kawasaki (JP);
Yoshiaki Suzuki, Kawasaki (JP);
Takashi Awai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1280 days.

(21) Appl. No.: 11/156,448

(22) Filed: Jun. 21, 2005

(65) Prior Publication Data
US 2005/0286943 A1 Dec. 29, 2005

(30) Foreign Application Priority Data

Jun. 23, 2004 (JP) ................................ 2004-184536

(51) Int. Cl.
*G03G 15/00* (2006.01)
*B65H 3/44* (2006.01)

(52) U.S. Cl. ....... 399/363; 399/367; 400/605; 271/9.07; 271/9.11; 271/9.12

(58) Field of Classification Search .................. 399/363, 399/393, 367, 377, 370, 371, 376, 386, 389; 400/605; 271/9.07, 9.11, 9.12; 358/498
See application file for complete search history.

(56) References Cited

U.S. PATENT DOCUMENTS

| | | | |
|---|---|---|---|
| 5,363,184 A * | 11/1994 | Matsuo et al. ................. | 399/367 |
| 5,391,009 A | 2/1995 | Stodder | |
| 5,587,812 A | 12/1996 | Kasuya | |
| 5,592,280 A | 1/1997 | Ishizuka et al. ................ | 399/410 |
| 5,635,500 A | 6/1997 | Akagi et al. ................... | 514/203 |
| 5,651,623 A | 7/1997 | Stodder et al. | |
| 5,727,890 A | 3/1998 | Stodder et al. ................. | 400/624 |
| 5,729,791 A | 3/1998 | Kutsuwada et al. ............ | 399/82 |
| 5,738,454 A | 4/1998 | Zepeda et al. | |
| 5,913,099 A | 6/1999 | Kamei et al. ................... | 399/296 |
| 5,940,543 A | 8/1999 | Isemura et al. ................ | 382/284 |
| 5,963,754 A * | 10/1999 | Itoh et al. ......................... | 399/21 |
| 6,113,093 A | 9/2000 | Morinaga et al. .............. | 271/162 |

(Continued)

FOREIGN PATENT DOCUMENTS

JP 57-67431 4/1982

(Continued)

OTHER PUBLICATIONS

European Search Report dated Sep. 27, 2005, issued in corresponding European patent appln. No. EP 05 01 3275, forwarded in a Communication dated Oct. 18, 2005.

*Primary Examiner* — Daniel J Colilla
*Assistant Examiner* — Jennifer Simmons
(74) *Attorney, Agent, or Firm* — Fitzpatrick, Cella, Harper & Scinto (57) ABSTRACT

An image processing apparatus has an original mount, a recording material mount for mounting recording materials, a supply roller, a separating unit, a reading unit for reading an image of the original, an original detection sensor for detecting the original on the original mount, and an original widthwise direction reference surface for being abutted by the original mounted on the original mount to position that original. The recording material widthwise direction reference surface is used to position the recording material so that a portion of the original does not superpose on the recording material having a maximum width and the original detection sensor detects that a portion of the original mounted on the original mount is not superposed on the recording material having maximum width.

8 Claims, 8 Drawing Sheets

U.S. PATENT DOCUMENTS

| | | | |
|---|---|---|---|
| 6,134,417 A * | 10/2000 | Fukasawa | 399/367 |
| 6,385,406 B1 | 5/2002 | Funamizu et al. | 399/16 |
| 7,077,517 B2 | 7/2006 | Awai et al. | 347/104 |
| 2004/0105109 A1 * | 6/2004 | Terashima et al. | 358/1.12 |
| 2004/0130089 A1 | 7/2004 | Suzuki et al. | 271/9.01 |
| 2005/0286942 A1 | 12/2005 | Terashima et al. | 399/361 |
| 2005/0286943 A1 | 12/2005 | Terashima et al. | 399/361 |

FOREIGN PATENT DOCUMENTS

| | | |
|---|---|---|
| JP | 61-128233 | 6/1986 |
| JP | 2-51182 | 2/1990 |
| JP | 2-257755 | 10/1990 |
| JP | 3-243545 | 10/1991 |
| JP | 7-181763 | 7/1995 |
| JP | 7-183990 | 7/1995 |
| JP | 8-119471 | 5/1996 |
| JP | 8-214110 | 8/1996 |
| JP | 2928309 B2 | 8/1999 |
| JP | 2004-184537 | 7/2004 |
| JP | 2004-184538 | 7/2004 |
| JP | 2004-203509 | 7/2004 |

* cited by examiner

IMAGE PROCESSING APPARATUS

BACKGROUND OF THE INVENTION

1. Field of the Invention

The present invention relates to an apparatus structure in an image processing apparatus such as a facsimile machine in which an original and a recording material have a common conveyance passage.

2. Related Background Art

Conventionally, there is proposed an image processing apparatus such as a facsimile machine in which an original and a recording material have a common conveyance passage for the sake of reducing in size and cost of the image processing apparatus.

Figure 8:
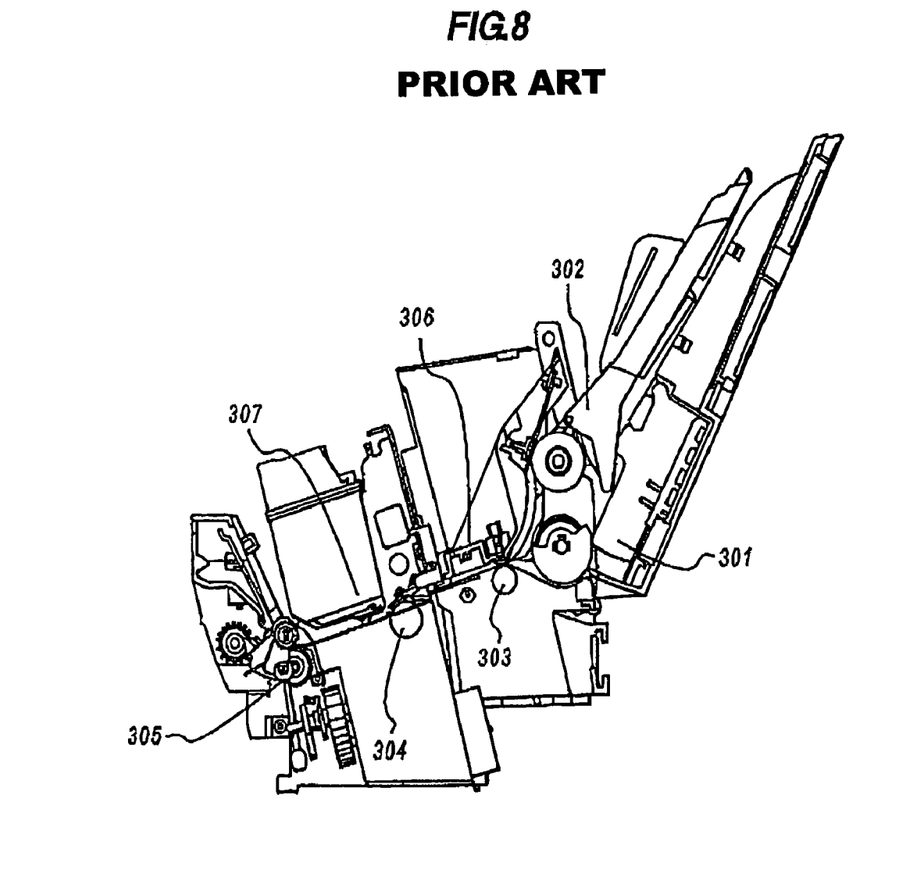
FIG. 8 is a diagram showing an example of a conventional image processing apparatus.

FIG. 8 shows one example of the structure. The image processing apparatus shown in FIG. 8 includes an ASF UNIT 301 for separating and conveying a batch of recording materials mounted in a mount one-sheet by one-sheet, and ADF UNIT 302 for separating and conveying a batch of mounted originals one-sheet by one-sheet, an auxiliary conveyance roller 303 for conveying the recording material or original conveyed from the ASF UNIT 301 or the ADF UNIT 302, a main conveyance roller 304 for conveying the recording material or the original at a predetermined speed, a discharge roller 305 for discharging the original or the recording material out from the apparatus, a scanner unit 306 for reading data of the original, and a recording unit 307 for forming an image on the recording material. In the above structure, a guide member forms the auxiliary conveyance roller 303, the main conveyance roller 304, the discharge roller 305 and a conveyance passage, and the guide member is commonly used for both originals and recording materials so that the apparatus is reduced in size and cost. A facsimile machine having such a structure is proposed in U.S. Pat. No. 5,727,890.

There is proposed a structure for supplying recording materials from a cassette and a manual feeder opening by controlling rotation and turning motion of one supply roller (Japanese Patent Application Laid-open No. H03-243545). According to the structure described in Japanese Patent Application Laid-open No. H03-243545, the supply roller can be turned and moved between two recording material mounting means so that the recording material can be supplied from any of the mounting means.

In the structure of U.S. Pat. No. 5,727,890, however, since the scanner unit 306 is disposed upstream from the main conveyance roller 304, the auxiliary conveyance roller 303 is provided for making up unstable conveying speed of the ADF UNIT 302 and for conveying the original to the main conveyance roller 304. Therefore, as compared with a structure in which the original and the recording material comprise different conveyance means and conveyance passages, only the discharge roller 305 is commonly used, and the apparatus can not sufficiently be reduced in cost and size.

According to the structure of Japanese Patent Application Laid-open No. H03-243545, the mechanism for turning the supply roller and the control manner thereof are complicated, and each mounting means must have the separating means. Therefore, the apparatus can not be sufficiently reduced in cost and size.

SUMMARY OF THE INVENTION

It is an object of the present invention to provide an image processing apparatus capable of separately supplying both the originals and recording materials by one separating/supplying mechanism, and capable of inexpensively and reliably detecting the originals irrespective of presence or absence of the recording materials.

To achieve the above object, a typical structure of an image processing apparatus of the present invention comprises original mounting means for mounting originals, a recording material mounting means for mounting recording materials, a supply roller for supplying the originals or recording materials from the original mounting means or the recording material mounting means, separating means for separating the original or the recording material in cooperation with the supply roller, reading means reading an image of the original, recording means for recording the image on the recording material, and a original detection sensor for detecting the original on the original mounting means, the original mounting means and the recording material mounting means are disposed between the supply roller and the separating means, references of the original mounting means and the recording material mounting means in their widthwise directions are one-sided reference, a reference surface of the original mounting means and a reference surface of the recording material mounting means are set on opposite sides with respect to the apparatus, and the original detection sensor is disposed in a region where no recording material is mounted.

According to the present invention, in the image processing apparatus having the reading means and recording means, the supply roller, the separating means and the conveyance passage for separating and supplying the originals and the recording materials can commonly be used. Therefore, the apparatus can be reduced in size and cost. Irrespective of the fact that these elements are commonly used and irrespective of whether there exists the recording material, it is possible to inexpensively and reliably detect the original.

DETAILED DESCRIPTION OF THE PREFERRED EMBODIMENT

Best Mode for Carrying Out the Invention

An embodiment of the present invention will be explained in detail using the drawings. The scope of the invention is not limited to sizes, materials, shapes and relative positions of constituent elements described in the embodiment unless otherwise specified.

Figure 1:
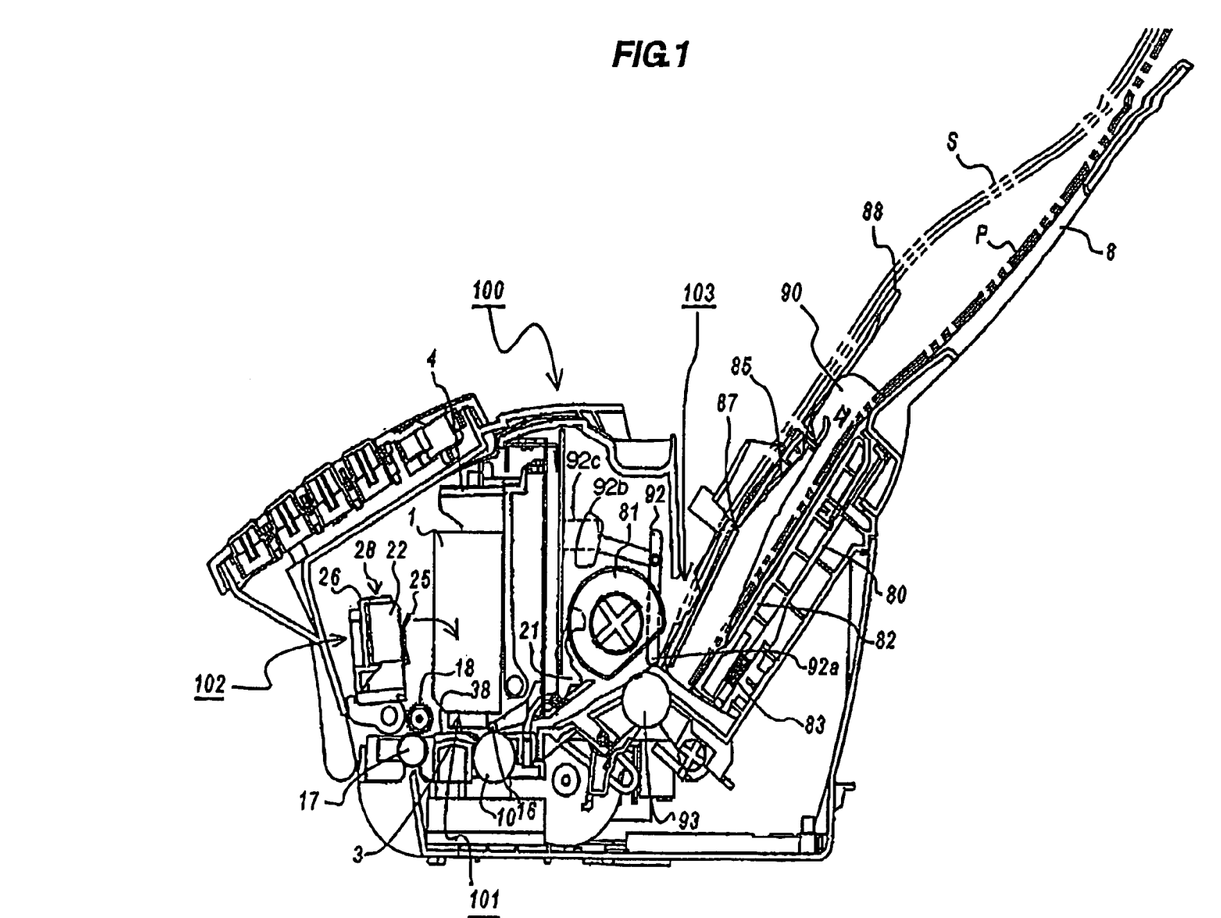
FIG. 1 a sectional view showing a structure of an image processing apparatus of an embodiment.

FIG. 1 is a sectional view showing a structure of an image processing apparatus of the embodiment of the invention. The image processing apparatus will be explained while taking the case of a facsimile machine. In the facsimile machine 100 shown in the drawings, recording materials P and originals S are set. The facsimile machine 100 includes an image recording unit 101 having a cartridge 1 as an example of recording means, an image reading apparatus 102 having an image reading unit 28 as an example of reading means, and an automatic feeder unit 103 which separates the plurality of recording materials P or originals S one-sheet by one-sheet from each other and conveys the same to the image recording unit 101 or the image reading apparatus 102.

The automatic feeder unit 103 is provided at its downstream portion with a PE sensor lever 21 (Page End sensor lever) for detecting the recording materials P (or originals S), a conveyance unit for conveying the sheets at predetermined speed in the image recording unit 101 and the image reading apparatus 102, and a discharge unit for discharging the recorded and read sheets out from the apparatus. The conveyance unit comprises a conveyance roller 10 including a metal shaft and a rubber roller, and a plurality of pinch rollers 16 disposed in a widthwise direction of the sheet which are biased against the conveyance roller 10. The discharge unit comprises a discharge roller 17 in which an elastomer is integrally molded around a plastic shaft, and a spur 18 biased against the discharge roller 17. A platen 3 is provided as a paper-through surface from a paper-through surface of the ASP base 80 to the discharge roller 17. The platen 3 is formed at its recording material support surface with a plurality of ribs 38 in the widthwise direction of the recording material. When the recording materials are conveyed, the recording materials P pass through the upper surfaces of the ribs 38. The conveyance passage extending from the supply roller 81 to the discharge roller 17 is a common conveyance passage through which both the originals and the recording materials pass.

The image recording unit 101 is of an ink-jet recording type which discharges ink from the cartridge 1 to record. The cartridge 1 is mounted on a carriage 4, and scans in a widthwise direction intersecting with the conveyance direction of the recording materials P. In this embodiment, the present invention is applied to a serial type recording apparatus which moves a recording heat in a main scanning direction. The present invention can also be applied to a full-line type recording apparatus which uses a recording heat extending over the entire region of the sheet in its widthwise direction to record an image by the recording head while continuously conveying a recording sheet.

The image reading unit 28 of the image reading apparatus 102 includes a contact image sensor (CS22, hereinafter) which is image reading means, a CS holder 26 which is a member holding the CS22, and a white reference member 25 which is held by the CS holder 26 such that the white reference member 25 is opposed to the CS22. The image reading unit 28 is usually at a standby position (standby state) separated from the platen 3. If the apparatus body receives a command for reading an image such as copy or sending, the image reading unit 28 turns in the direction of arrow in the drawing by driving means (not shown), and moves to a reading position opposed to the platen 3 (reading state). By providing the image reading unit 28 in a moving path of the carriage 4, the entire facsimile machine can be reduced in size. During the image-recording operation, the image reading unit 28 is moved to the standby position which is out from the moving region of the carriage 4, the image reading unit 28 does not interfere with the moving space of the carriage 4.

Originals supplied to the image reading apparatus 102 are conveyed to the image reading unit 28 by the conveyance roller 10 and the pinch roller 16 which are commonly used for the recording materials. The originals S sandwiched and conveyed by the conveyance roller 10 and the pinch roller 16, as well as the discharge roller 17 and the spur 18, the reading operation is carried out by the image reading unit 28 and the originals S are discharged out from the apparatus.

Figure 2:
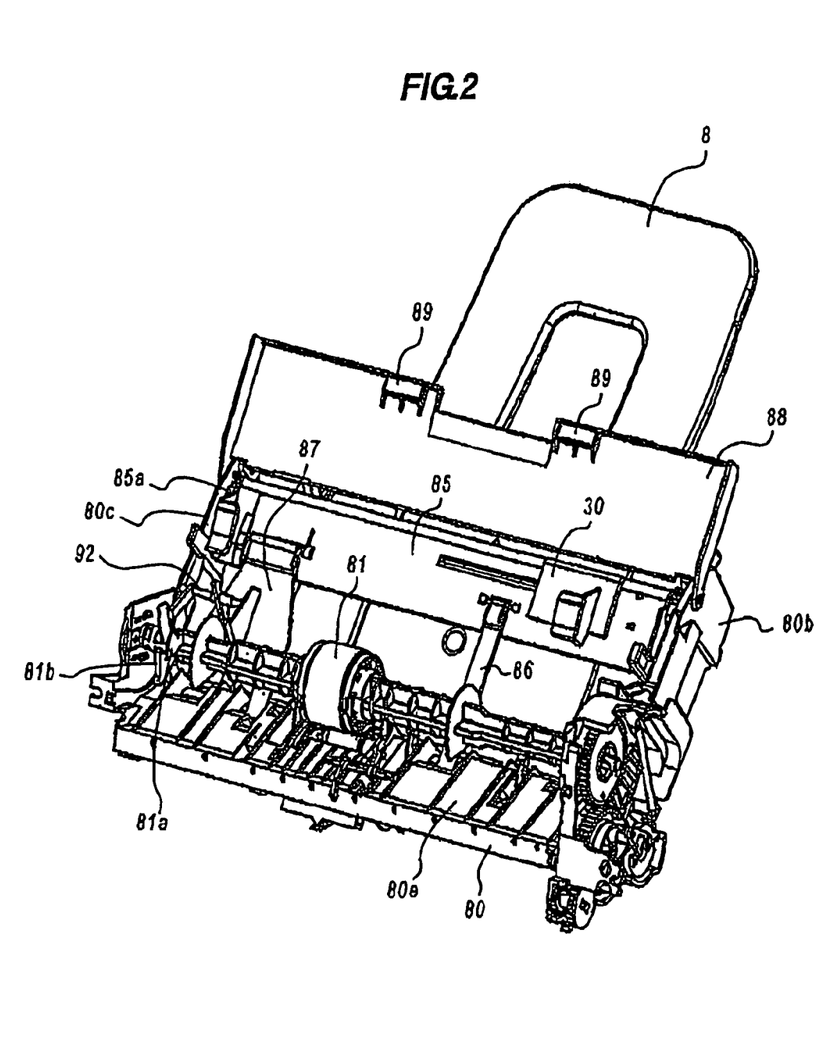
FIG. 2 is a perspective view showing an automatic feeder unit when originals and recording materials are not set.
Figure 3:
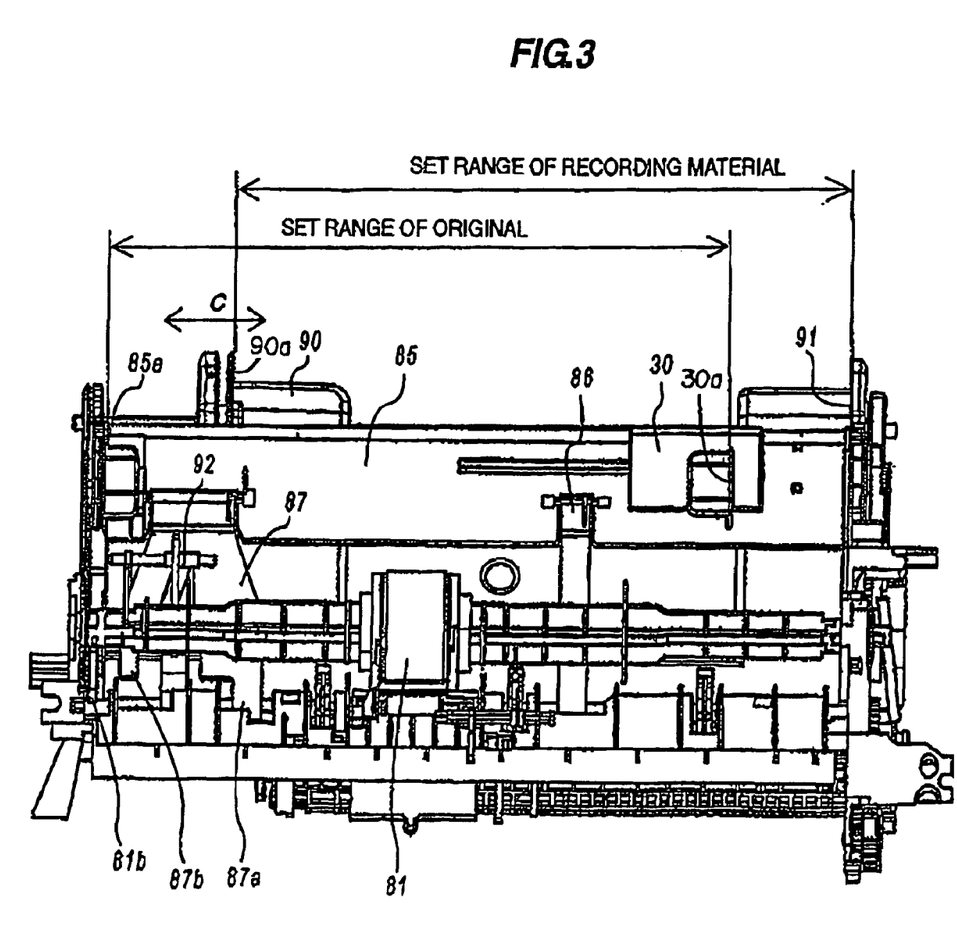
FIG. 3 is a front view showing the automatic feeder unit when the originals and the recording materials are not set.
Figure 4:
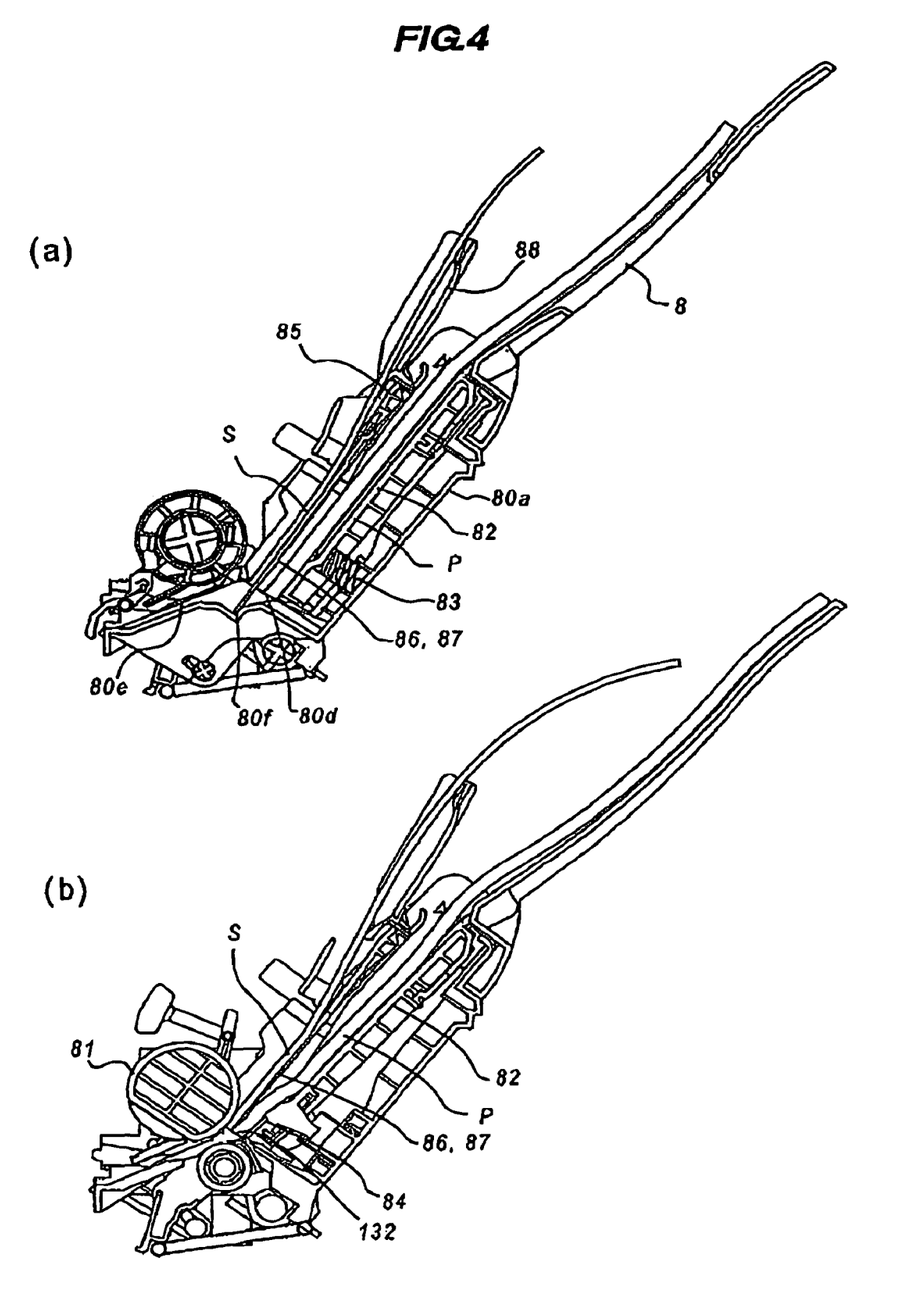
FIG. 4 are sectional views showing a state in which only the originals are set.
Figure 5:
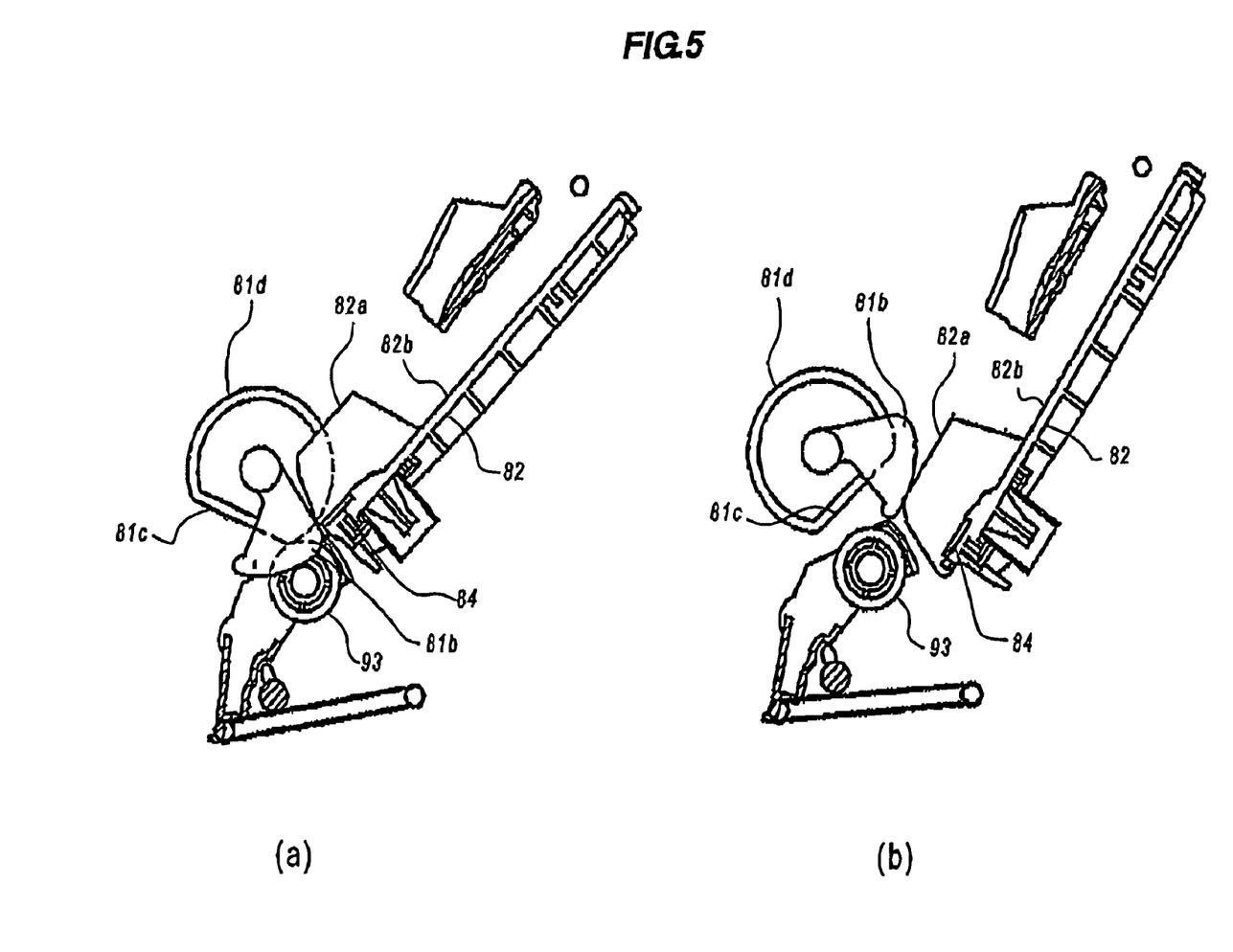
FIG. 5 are schematic sectional views showing motions of a pressure plate and a supply roller of the automatic feeder unit.
Figure 6:
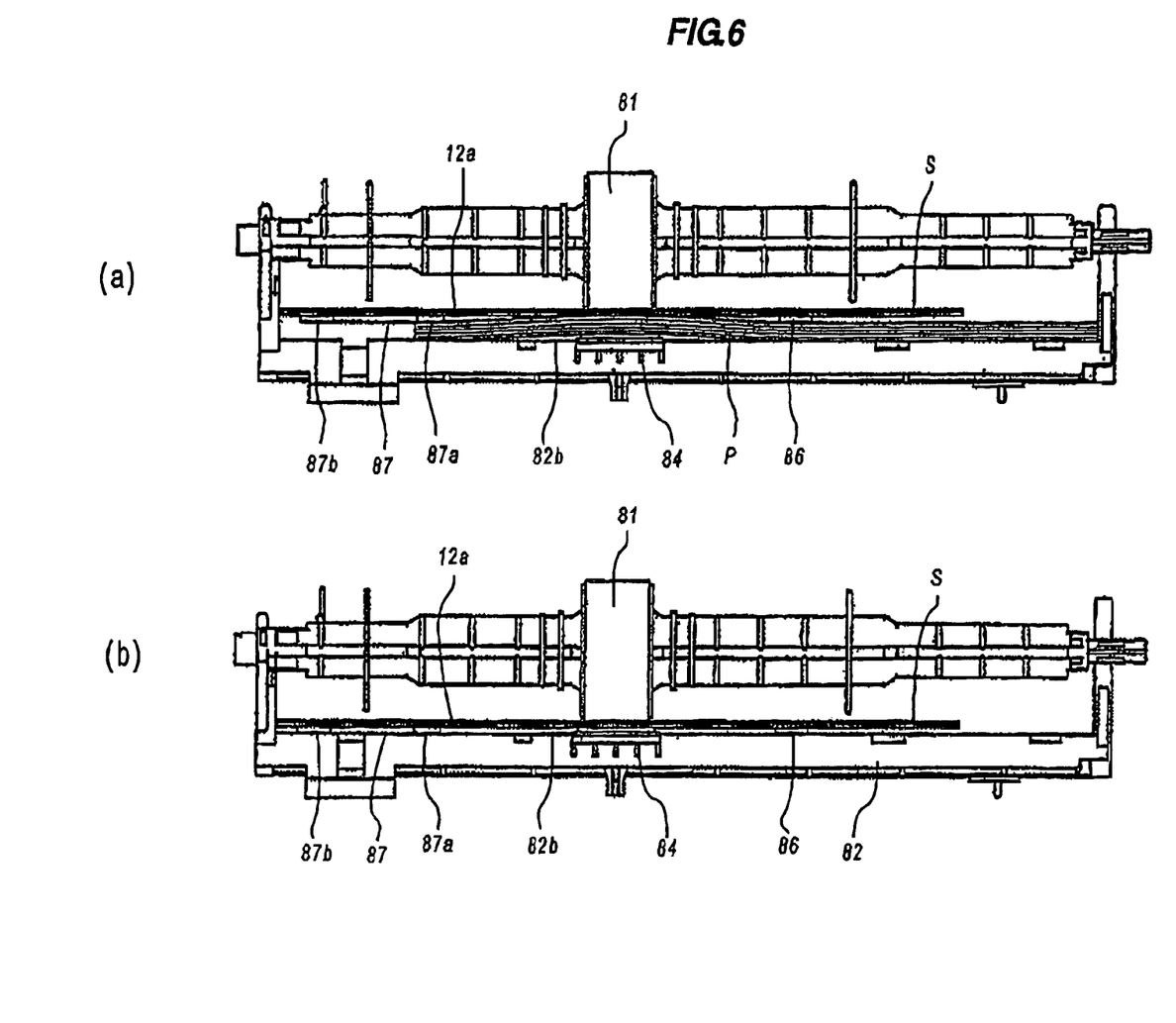
FIG. 6 are front views used for explaining a state when the paper is supplied.
Figure 7:
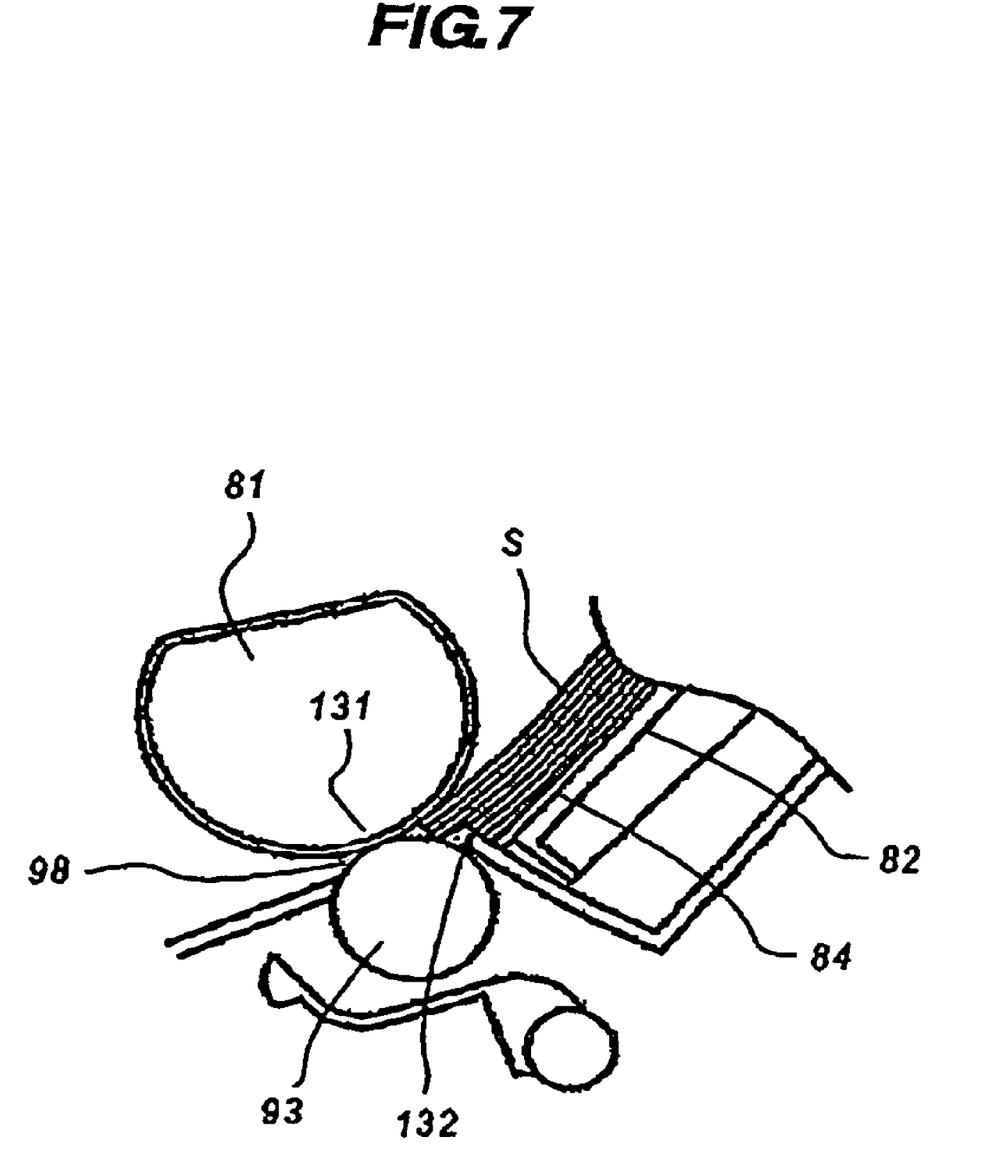
FIG. 7 is a schematic sectional view used for explaining a separating unit.

The automatic feeder unit (AFU) 103 will be explained. FIG. 2 is a perspective view showing the automatic feeder unit in which originals and recording materials are not set. FIG. 3 is a front view showing the automatic feeder unit when the originals and the recording materials are not set. FIG. 4 is a sectional view showing a state in which only the originals are set. FIG. 5 is a schematic sectional view showing motions of a pressure plate and a supply roller of the automatic feeder unit. FIG. 6 is a front view used for explaining a state when the paper is supplied. FIG. 7 is a schematic sectional view used for explaining a separating unit.

As shown in FIGS. 2 and 4A, the ASF base 80 which is a frame of the automatic feeder unit 103 comprises a base surface 80a, a right side plate 80b, a left side plate 80c, a tip end reference surface 80d against which tip ends of the originals S and the recording materials P are abutted at the time of setting, and a paper-through surface 80e.

A supply roller 81 and a pressure plate 82 are rotatably mounted on the right side plate 80b and the left side plate 80c through bearings. The pressure plate 82 is biased against the supply roller 81 by a pressure plate spring 83 mounted between a back surface of the pressure plate 82 and the base surface 80a of the ASF base 80.

As shown in FIGS. 2 and 5, the shaft of the supply roller 81 is provided with a driving cam 81b, and the pressure plate 82 is provided with a follower cam 82a. As shown in FIG. 5A, the pressure plate 82 functions as a pushing member for pushing a batch of recording materials P or originals is pushed against the supply roller 81 by the pressure plate spring 83 at the time of supplying. Further, as shown in FIG. 5B, the pressure plate 82 is pushed down by the follower cam 82a except when the original or recording material is supplied, a gap through which the originals and recording materials are set is formed between the pressure plate 82 and the supply roller 81, and the pressure plate 82 functions as recording material mounting means. That is, the pressure plate 82 is separated by rotation of the supply roller 81, and the driving cam 81b and the follower cam 82a constitute separating means.

The supply roller 81 is integrally formed at its shaft with a ASF sensor flag 81a. The ASF sensor flag 81a engages with an ASF sensor (not shown) to detect a phase of the supply roller 81. A cross section of the supply roller 81 is a so-called D cut roller having an arc portion 81d and a straight portion 81c. Phases of the driving cam 81b and a semi-circular shape of the roller are designed such that the straight portion 81c and the separating pad 84 as an example of the separating means are opposed when the pressure plate 82 is separated (FIG. 4(a)), and the pressure plate 82 and the arc portion 81d of the supply roller 81 come into contact with each other at the time of biasing (FIG. 4(b)).

A separating pad 84 is pasted on a central portion of a tip end of the pressure plate 82, and the separating pad 84 and the supply roller 81 are opposed to each other in a biasing state at the time of supplying operation. Further, as shown in FIG. 5, the separating pad 84 slightly projects from the recording material mounting surface 82b toward the supply roller 81 and in this embodiment, the separating pad 84 projects by a thickness corresponding to the maximum set number of the originals.

A separation roller 93 as an example of separating means is disposed downstream from a nip position between the supply roller 81 and the separating pad 84 such that the separation roller 93 abuts against the supply roller 81. The separation roller 93 includes a torque limiter, and the separation roller 93 can be separated from and come into contact with the supply roller 81. As shown in FIG. 7, the automatic feeder of this embodiment is separated through two separating means, i.e., a front separating unit and main separating unit. The front separating unit includes a separating pad 84 of the pressure plate 82, the supply roller 81 and the passing-limitation wall 132. The passing-limitation wall 132 is a barrier wall formed such that a gap of passing paper formed between the supply roller 81 and the ASF base 80 is about 1 mm. When 50 recording materials are set for example, the 50 recording materials are separated into groups each comprising several sheets by the passing-limitation wall 132, and they are conveyed to the main separating unit 131. The main separating unit 131 comprises the supply roller 81 and the separation roller 93, and separates the several sheets sent by the front separating unit by the above operation.

An original stage 85 as an example of an original mounting means is detachably mounted on the pressure plate 82 at a predetermined distance from the recording material mounting surface 82b. An original bridge right 86 and an original bridge left 87 are rotatably mounted on the original stage 85. In a state in which the original stage 85 is mounted on the pressure plate 82, tip ends of the original bridges 86 and 87 are limited by a recess 80f of the ASF base 80 such that a predetermined gap is formed with respect to the recording material mounting surface of the pressure plate 82 (FIG. 4A).

A recording material tray 8 is mounted on the ASF base 80 to extend a recording material mounting surface starting from the pressure plate 82. Similarly, an original tray 88 is fixed to the original stage 85 to extend the original mounting surface. A slip preventing member 89 is mounted on a tip end of the original tray 88 (rear end thereof in the conveyance direction). A length supported by the original tray 88 and the original stage 85 is about ⅔ of the entire length of A4-size paper. When A4-size originals are set, ⅓ of rear end is free. When the paper is soft, the paper lops rearward due to its own weight as shown in FIG. 1, and its rear end is supported by the recording material tray 8.

As shown in FIG. 3, a side guide 90 is mounted on the pressure plate 82 such that the side guide 90 can slide in a direction of arrow C intersecting with the conveyance direction of the recording materials P by the supply roller 81 at right angles. An original slider 30 is mounted on the original stage 85 also such that the original slider 30 can slide in the direction of arrow C. When the recording materials are to be set, concerning the widthwise direction, right sides of the recording materials are abutted against a recording material widthwise direction reference surface 91 formed on the pressure plate 82, left sides of the recording materials are limited by a guide surface 90a of the side guide 90, tip ends of the recording materials are supported by the tip end reference surface 80d, and the entire recording materials are supported by the recording material tray 8 and the recording material mounting surface 82b of the pressure plate 82 (FIGS. 1 and 3). When the originals are to be set, left sides of the originals are abutted against the original widthwise direction reference surface 85a formed on the original stage 85, right sides of the originals are limited by a guide surface 30a of the original slider 30, tip ends of the originals are supported by the tip end reference surface 80d, and the entire originals are supported by the original tray 88, the original stage 85, and the original bridges 86 and 87 (FIGS. 1, 3 and 4).

A recording material widthwise direction reference surface 91 and an original widthwise direction reference surface 85a are respectively disposed on left and right sides of the apparatus, and are relatively deviated from each other by about 30 mm in the widthwise direction. Therefore, when both the recording materials and originals are set, no recording materials exist below the originals in a region of about 30 mm from the reference side of the original even when recording materials having maximum width are set (FIG. 3). A sensor for detecting whether an original exists or not is disposed in a region where the recording materials are not set. This sensor comprises a photo interrupter 92c and a DS actuator 92 which is rotatably supported by a holder (not shown). If originals are set, the originals and an arm 92a abut against each other, an actuator 92 rotates, a sensor flag 92b selectively cuts off optical path of a photo interrupter 92c, thereby turning the sensor ON or OFF (FIG. 1). A tip end of the original bridge left 87 is bifurcated, one (87a) of the bifurcated end comes above the set recording materials, and the other end 87b is located at a position where there is no recording material. An arm of the DS actuator 92 moves between the bifurcated ends (FIG. 2).

When only the recording materials are set, this state corresponds to FIG. 4A from which the originals S are removed. If the supply roller rotates, the pressure plate 82 is moved by the driving cam 81b to a direction in which the pressure plate 82 is biased by the supply roller 81 (FIG. 5B), and the pressure plate 82 comes into contact with the uppermost recording material P. At that time, the original bridges 86 and 87 are located on an upper portion of the recording material, but since the original bridges 86 and 87 are located at a position where they are escaped from the supply roller in the widthwise direction, they are on standby above the supply roller so that they do not hinder the separating motion (FIGS. 2 and 3).

FIG. 4A shows a state in which both the originals S and recording materials P are set. If the supply roller rotates, the pressure plate 82 is moved by the driving cam 81b in the direction in which the pressure plate 82 is biased by the supply roller 81 (FIG. 5B), the originals S are biased through the recording materials P, and the uppermost original S comes into contact with the supply roller 81. At that time, the original bridges 86 and 87 are sandwiched between the recording material P and the original S, but the separating pad 84 projects from the recording material mounting surface 82b as shown in FIG. 6A, and the original bridges 86 and 87 escape from the supply roller 81 in the widthwise direction. Therefore, a predetermined biasing force is applied between the original S and the supply roller 81 without excessively deforming the original. Although there is no recording material P below a region of about 30 mm of the original S on the reference side, since the original is supported by the original bridge left 87, the original does not loop downward. This is because that the original bridge left 87 is bifurcated as described above and one of them comes over the recording material P and limits its position. The originals can be supported in accordance with change of the number of set recording materials P.

When only the originals S are set, the originals S are directly biased by the pressure plate 82 as shown in FIG. 6B, and the uppermost original S comes into contact with the supply roller 81. At that time, the original bridges 86 and 87 are sandwiched between the pressure plate 82 and the original S, but since the separating pad 84 projects from the recording material mounting surface 82b, the separating pad 84 and the original bridges 86 and 87 assume substantially at the same height and thus, a predetermined biasing force is applied between the original S and the supply roller 81 without excessively deforming the original. If the separating pad 84 and the recording material mounting surface 82b assume the same height, since the original S is biased against the supply roller 81, it becomes necessary to deform the original in the widthwise direction by an amount corresponding to the thickness of the original bridges 86 and 87. In this case, the biasing force of the pressure plate 82 is used for deforming the original S, appropriate biasing force is not applied to the supply roller 81 and the supply failure is generated in some cases.

According to the present invention, as explained above, the apparatus comprises a supply roller which supplies an original or a recording material from the original mounting means or the recording material mounting means, separating means for separating the original or the recording material in cooperation with the supply roller, and a conveyance passage through which both the original and recording material pass. Therefore, constituent members of the apparatus can commonly be used, and the apparatus can be reduced in size and cost.

According to the above-described structure, the uppermost one of the set recording materials or originals is separated, and this is conveyed to the reading means or recording means. Thus, if only the recording materials are set, the recording material is separated and conveyed, and if the originals are set above or on the recording material, the original is separated and conveyed. Therefore, in order to determine whether the automatic feeder unit separated the original or the recording material, it is absolutely necessary to detect whether the originals are set. If the originals are set, it is determined that the original is separated, and if the originals are not set, it is determined that the recording material is separated. Thereupon, according to the present invention, the reference of the recording material and the original in the widthwise direction is laterally reversed, the setting positions of the originals and the recording materials are laterally deviated so that the recording materials are not located below the originals in a predetermined region from the reference side in the widthwise direction of the original, and the original detection sensor is disposed in a region where the originals and the recording materials are not superposed on each other. Thus, even if both the originals and the recording materials are set, since there is sufficient space below the originals, it is possible to dispose the reliable original detection sensor with least inexpensive structure, i.e., the photo interrupter and the actuator.

CROSS-REFERENCE TO RELATED APPLICATION

This application claims the benefit of priority from the prior Japanese Patent Application No. 2004-184536 filed on Jun. 23, 2004 the entire contents of which are incorporated herein by reference.

The invention claimed is:

1. An image processing apparatus comprising:
a recording material mounting unit that mounts for mounting recording materials thereon;
an original mounting unit, disposed above the recording material mounting unit, for mounting originals thereon;
a supply roller that supplies the originals or recording materials from the original mounting unit or the recording material mounting unit;
a separating unit that separates one of the originals or one of the recording materials in cooperation with the supply roller;
a reading unit that reads an image of an original;
a recording unit that records the image on a recording material;
an original detection sensor, disposed above the original mounting unit, that which detects the original on the original mounting unit;
an original widthwise direction reference surface that abuts the original mounted on the original mounting unit to position the original; and
a recording material widthwise direction reference surface that abuts the recording material mounted on the recording material mounting unit to position the recording material,
wherein no recording material exists below a portion contacted by the original detection sensor of the original on the original mounting unit abutting the original widthwise direction reference surface when the widest recording material available to the image processing apparatus is mounted on the recording material mounting unit abutting against recording material widthwise direction reference surface.

2. The image processing apparatus according to claim 1, wherein a distance between the reference surface of the original mounting unit and the reference surface of the recording material mounting unit is wider than a width of the maximum recording materials which can be conveyed by an apparatus body.

3. An image processing apparatus comprising:
a recording material mounting unit mounts for mounting recording materials thereon;
an original mounting unit for mounting originals thereon, wherein the originals on the original mounting unit are partially overlapped with the recording materials mounted on the recording material mounting unit;
a supply roller that supplies the originals or the recording materials from the original mounting unit or the recording material mounting unit;
a separating unit that separates one of the originals or one of the recording materials in cooperation with the supply roller;
an original detection sensor, disposed above the original mounting unit, that which detects an original on the original mounting unit;
an original widthwise direction reference surface that abuts the original mounted on the original mounting unit to position the original; and
a recording material widthwise direction reference surface that abuts a recording material mounted on the recording material mounting unit to position the recording material,
wherein no recording material exists below a portion contacted by the original detection sensor of the original on the original mounting unit abutting the original widthwise direction reference surface when the widest recording material available to the image processing apparatus is mounted on the recording material mounting unit abutting against recording material widthwise direction reference surface.

4. The image processing apparatus according to claim 3, wherein the original detection sensor includes a photo interrupter, and a light shielding member that shields an optical path of the photo interrupter in association with the rocking motion of the arm.

5. The image processing apparatus according to claim 3, wherein when the original is not mounted on the original mounting unit, the recording material mounting unit pushes the recording material mounted on the recording material mounting unit against the supply roller.

6. The image processing apparatus according to claim 3, wherein when the original is mounted on the original mounting unit, the recording material mounting unit pushes up the original mounting unit directly or through the recording material mounted on the recording material mounting unit, and pushes the original mounted on the original mounting unit against the supply roller.

7. The image processing apparatus according to claim 6, wherein the original mounting unit includes a plate member on which the original is mounted, the plate member is pushed up directly by the recording material mounting unit or through the recording material mounted on the recording material mounting unit.

8. The image processing apparatus according to claim 7, wherein the plate member is integrally formed with a portion which is pushed up by the recording material mounting unit and a portion which supports a portion of the original that is not superposed on the recording material.

* * * * *